US011362903B2

(12) United States Patent
Cherrington et al.

(10) Patent No.: US 11,362,903 B2
(45) Date of Patent: Jun. 14, 2022

(54) HIGH PERFORMANCE AND SCALABLE MULTI-LAYER TOPOLOGY DISCOVERY SYSTEMS AND METHODS

(71) Applicant: Ciena Corporation, Hanover, MD (US)

(72) Inventors: John Wade Cherrington, Salt Spring Island (CA); Ankur Jain, Gurgaon (IN)

(73) Assignee: Ciena Corporation, Hanover, MD (US)

(*) Notice: Subject to any disclaimer, the term of this patent is extended or adjusted under 35 U.S.C. 154(b) by 4 days.

(21) Appl. No.: 16/801,369

(22) Filed: Feb. 26, 2020

(65) Prior Publication Data

US 2021/0218635 A1 Jul. 15, 2021

(30) Foreign Application Priority Data

Jan. 13, 2020 (IN) .............................. 202011001395

(51) Int. Cl.
*G06F 15/173* (2006.01)
*H04L 41/12* (2022.01)
*H04L 67/01* (2022.01)

(52) U.S. Cl.
CPC .............. *H04L 41/12* (2013.01); *H04L 67/42* (2013.01)

(58) Field of Classification Search
CPC ....................................................... H04L 41/12
See application file for complete search history.

(56) References Cited

U.S. PATENT DOCUMENTS

| 9,391,828 B1* | 7/2016 | Dubrovsky ....... H04L 29/08072 |
| 10,693,900 B2* | 6/2020 | Zadeh ..................... H04L 43/08 |
| 2016/0359686 A1* | 12/2016 | Parandehgheibi ...... H04L 41/22 |
| 2017/0109647 A1* | 4/2017 | Chow .................... G06N 20/00 |
| 2020/0092252 A1* | 3/2020 | Tillotson ............ H04L 12/4645 |

\* cited by examiner

*Primary Examiner* — Ryan J Jakovac
(74) *Attorney, Agent, or Firm* — Clements Bernard Baratta; Lawrence A. Baratta, Jr.; Christopher L. Bernard

(57) ABSTRACT

High performance and scalable multi-layer topology discovery systems and methods provide awareness of what services are present across a multi-layer network. The present disclosure achieves a high level of performance in service discovery, and, in addition, provides a form of scalability in proportion to network size by distributing service observation across servers in a cluster. The present disclosure defines a concept of change-proportional online run-time efficiency and thus provides an optimal design. Further, the present disclosure achieves horizontal scale, leveraging multiple cores across multiple servers.

17 Claims, 7 Drawing Sheets

HIGH PERFORMANCE AND SCALABLE MULTI-LAYER TOPOLOGY DISCOVERY SYSTEMS AND METHODS

FIELD OF THE DISCLOSURE

The present disclosure generally relates to network management. More particularly, the present disclosure relates to high performance and scalable multi-layer topology discovery systems and methods.

BACKGROUND OF THE DISCLOSURE

Networks are formed through various network elements, devices, etc. which are network equipment including physical hardware, namely chassis, shelves, modules, line cards, blades, etc. Further, the network and the corresponding network equipment is managed by Network Management Systems (NMS), Operation Support Systems (OSSs), Element Management Systems (EMS), etc. which provide an interface for Operations, Administration, Maintenance, and Provisioning (OAM&P) functions, generally referred to herein as network management. One aspect of network management includes topology discovery which generally includes discovery and mapping of network devices, links, services, etc. That is, topology discovery includes communication between a management system and network devices. The conventional approach for topology discovery is based in essence on what is defined herein as "full-sweep discovery" which is a realization of service discovery that considers all network input data and returns all discovered services as a job that starts at a point in time and ends after a set period. When an updated view of the network is required, the full-sweep discovery is run on-demand again or as part of a periodically scheduled process.

Disadvantageously, this conventional full-sweep discovery approach has a high cost, operates continuously, and has poor resource trade-offs at scale. First, a single sweep takes resource complexity on the order of the network size. The primary downside is that the time to complete this analysis (and therefore latency against any change) will increase proportionally with total network size as the jobs take longer to execute to completion. Second, the latency cost of a full network sweep creates a motivation for the jobs to run continuously end-on-end (so as to minimize latency) and aggressively (using as many processors as possible, and attendant I/O for any shared state at scale). Third, a challenging aspect of service discovery with regard to scaling out work is that there is no prior-known partition of the network elements that would support trivial parallelism; generally speaking until discovery is run services could exist between any two endpoints; hence, even if the network did partition up cleanly into well balanced, disjoint islands these islands are not known ahead of time. A parallelization of the full-sweep discovery is still possible, and it typically involves some ad hoc distribution of starting seeds from which topology is walked out. However, not knowing where any given traversal will end creates following bad trade-off between sharing and replication: (a) Network-scale input data read by multiple workers will be needed, shared across network (I/O contention and additional latency) (b) Each worker will have to hold a full copy of network scale data (memory redundancy).

BRIEF SUMMARY OF THE DISCLOSURE

The present disclosure relates to high performance and scalable multi-layer topology discovery systems and methods. As described herein, topology discovery is a critical management function that provides awareness of what services are present across a multi-layer network. The present disclosure achieves a high level of performance in service discovery, and, in addition, provides a form of scalability in proportion to network size by distributing service observation across servers in a cluster. The present disclosure defines a concept of change-proportional online run-time efficiency and thus provides an optimal design. Further, the present disclosure achieves horizontal scale, leveraging multiple cores across multiple servers.

In an embodiment, a non-transitory computer-readable medium includes instructions stored thereon for programming a processing device to perform steps of obtaining incoming data on a per network element basis, from network elements in a multi-layer network having a plurality of network elements and having a server layer and a client layer; structuring the incoming data for topology discovery into atoms, each atom is a unit of data representing a server-server relationship or a client-server relationship; and processing the atoms to determine topology changes of services in the multi-layer network. The instructions can further program the processing device to perform steps of publishing output responsive to changes based on the incoming data and based on the processing the atoms. An amount of the processing can be proportional to ultimate output change.

The instructions can further program the processing device to perform steps of performing the processing the atoms concurrently across the server layer and the client layer. The instructions can further program the processing device to perform steps of utilizing a data structure in the structuring to detect a service completion at a layer, wherein the data structure represents connections in a graph, supporting a constant time lookup. The atoms can be utilized to detect a complete service, for the topology changes, through a connected trail of atoms and a client-server relationship on both ends of the connected trail of atoms. The incoming data can be asynchronous from the network elements.

In another embodiment, an apparatus includes a processor and memory including instructions that, when executed, cause the processor to obtain incoming data on a per network element basis, from network elements in a multi-layer network having a plurality of network elements and having a server layer and a client layer, structure the incoming data for topology discovery into atoms, each atom is a unit of data representing a server-server relationship or a client-server relationship, and process the atoms to determine topology changes of services in the multi-layer network. The instructions that, when executed, can further cause the processor to publish output responsive to changes based on the incoming data and based on the processing the atoms. An amount of the processing can be proportional to ultimate output change.

The instructions that, when executed, can further cause the processor to perform the processing the atoms concurrently across the server layer and the client layer. The instructions that, when executed, can further cause the processor to utilize a data structure in the structuring to detect a service completion at a layer, wherein the data structure represents connections in a graph, supporting a constant time lookup. The atoms can be utilized to detect a complete service, for the topology changes, through a connected trail of atoms and a client-server relationship on both ends of the connected trail of atoms. The incoming data can be asynchronous from the network elements.

In a further embodiment, a method includes obtaining incoming data on a per network element basis, from network elements in a multi-layer network having a plurality of network elements and having a server layer and a client layer; structuring the incoming data for topology discovery into atoms, each atom is a unit of data representing a server-server relationship or a client-server relationship; and processing the atoms to determine topology changes of services in the multi-layer network. The method can further include publishing output responsive to changes based on the incoming data and based on the processing the atoms. An amount of the processing can be proportional to ultimate output change. The method can further include performing the processing the atoms concurrently across the server layer and the client layer. The method can further include utilizing a data structure in the structuring to detect a service completion at a layer, wherein the data structure represents connections in a graph, supporting a constant time lookup. The atoms can be utilized to detect a complete service, for the topology changes, through a connected trail of atoms and a client-server relationship on both ends of the connected trail of atoms.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server, which may be used to implement a management system or the like;

DETAILED DESCRIPTION OF THE DISCLOSURE

Figure 1:
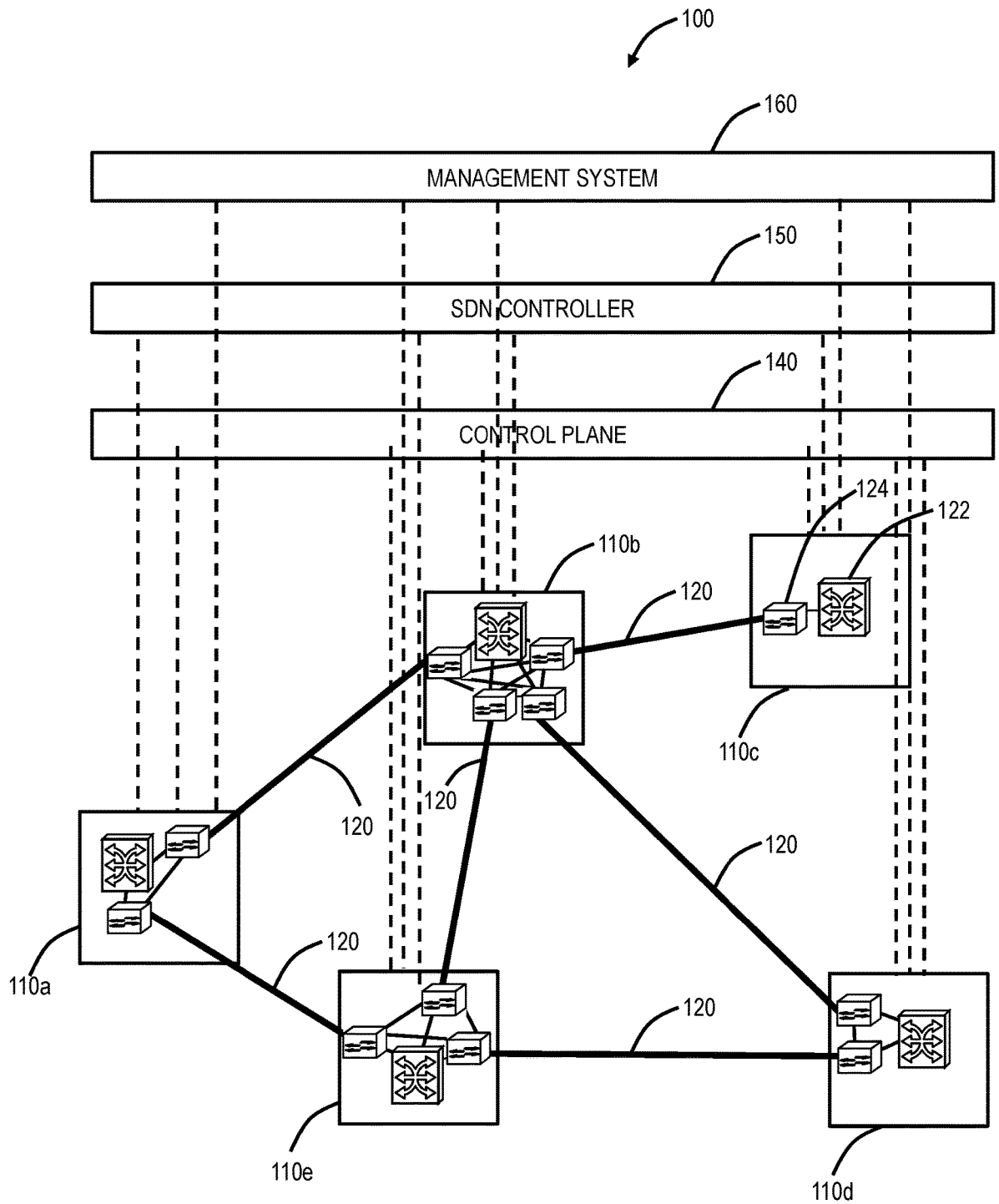
FIG. 1 is a network diagram of a network with five interconnected sites.

Again, the present disclosure relates to high performance and scalable multi-layer topology discovery systems and methods. As described herein, topology discovery is a critical management function that provides awareness of what services are present across a multi-layer network. The present disclosure achieves a high level of performance in service discovery, and, in addition, provides a form of scalability in proportion to network size by distributing service observation across servers in a cluster. The present disclosure defines a concept of change-proportional online run-time efficiency and thus provides an optimal design. Further, the present disclosure achieves horizontal scale, leveraging multiple cores across multiple servers.

The high-level structure of the system includes stages of pre-processing, core processing, and post-processing. The pre-processing stage filters incoming per-network element data streams. A model structure that has no further use in service discovery is dropped; structure that is required only by post-processing is forwarded to that stage, and the subset of event state relevant to core discovery is extracted and normalized into internal events forwarded to the core processing stage. The core processing stage is where the essential function of topology discovery is performed. The input this stage receives from the pre-processing stage are atomic relationships that have no further internal structure for purposes of resolving the service. The key relationship types within a network logical layer are the Server-Server (SS) atom, and the key relationship allowing for vertical, layer-to-layer structure is the Client-Server (CS) atom. The post-processing stage receives minimally descriptive events representing services discovered by the core stage and decorates them with whatever attributes are required given the modeling requirements of the management system.

The concept of change-proportional online run-time efficiency makes a clear break with traditional stitching designs (whether single or multi-threaded) that are based on the conventional full-sweep discovery approach. The change-proportional online run-time efficiency represents a form of optimum realizable service discovery realizing the maximum simultaneous amount of scale, performance, and work efficiency in a way the resolves long-running performance and resource trade-offs afflicting past systems. A key design element to delivering a change-proportional online requirement is the application of a particular data structure (the Union-Find-Delete or UFD) for detecting service completion at a layer with effectively constant time look-up, bypassing fruitless traversals which plague traditional designs. This approach has been established for a range of service topologies (uni- and bi-directional services, and service topologies spanning layers 0, 1 and 2, namely photonic, Time Division Multiplexing (TDM), and packet).

A key design element for providing scale-out while simultaneously having the per-layer performance above is to recognize that each layer can make efficient progress using whatever input they currently have and thus providing a form of pipeline concurrency. The pipeline concurrency can be realized on a single server but also spread out across servers where service completions are forwarded to next layer, providing a form of horizontal scale not present in past systems. An additional scale element is provided by use of a distributed UFD data structure within a given layer. This form of scale can be combined with pipeline style scale-out or used by itself.

The above considerations apply to a particular stitching model where network data has been normalized for both core input and core output as irreducible fragments called atoms. It is shown herein the process of atomization ("pre-processing") and of enriching output atoms with desired properties ("post-processing") are themselves amenable to horizontal scale. This enables horizontal scalability for the system as a whole.

§ 1.0 Multi-Layer Network

FIG. 1 is a network diagram of a network 100 with five interconnected sites 110a, 110b, 110c, 110d, 110e. The sites 110 are interconnected by a plurality of links 120. Each of the sites 110 can include a switch 122 and one or more WDM network elements 124. The switch 122 is configured to provide services at Layers 1 (e.g., Time Division Multiplexing (TDM), Optical Transport Network (OTN)) and/or Layer 2 (e.g., Ethernet, MPLS) and/or Layer 3 (e.g., IP) where the switch would normally be called a router. For illustration purposes, the network 100 is a multi-layer network with optical, TDM, packet, etc. Those skilled in the art will recognize any type of network at any layer or layers is contemplated herein with the network 100 presented as an example.

The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those skilled in the art will recognize that the switch 122 and the WDM network elements 124 may be realized in the same network element. The photonic layer and the photonic control operating thereon can also include intermediate amplifiers and/or regenerators on the links 120, which are omitted for illustration purposes. The network 100 is illustrated, for example, as an interconnected mesh network, and those skilled in the art will recognize the network 100 can include other architectures, with additional sites 110 or with fewer nodes sites, with additional network elements and hardware, etc.

The sites 110 communicate with one another optically over the links 120. The sites 110 can be network elements, which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network-level protection and restoration; and the like. In an embodiment, the control plane 140 can utilize Automatically Switched Optical Network (ASON), Generalized Multiprotocol Label Switching (GMPLS), or the like. Those of ordinary skill in the art will recognize the optical network 100, and the control plane 140 can utilize any type of control plane for controlling the switches 122 and establishing connections.

The optical network 100 can also include a Software-Defined Networking (SDN) controller 150. SDN allows the management of network services through abstraction of lower-level functionality. This is done by decoupling the system that makes decisions about where traffic is sent (SDN control through the SDN controller 150) from the underlying systems that forward traffic to the selected destination (i.e., the physical equipment in the network 100). Work on SDN calls for the ability to centrally program provisioning of forwarding on the optical network 100 in order for more flexible and precise control over network resources to support new services. The SDN controller 150 is a processing device that has a global view of the optical network 100. Additionally, the SDN controller 150 can include or connect to SDN applications which can utilize the data from the SDN controller 150 for various purposes.

There are various techniques for data communications between the switches 122, the WDM network elements 124, the control plane 140, the SDN controller 150, and a management system 160 for OAM&P purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols for OAM&P communications in the network 100.

The present disclosure focuses on topology discovery of devices and services in a network, such as via a management system 160. Again, the network 100 is presented for illustration purposes as one possible network for use with the inventory management systems and methods described herein. Various types of networks are contemplated, including single-layer networks, single protocol networks, etc. For example, one network implementation may only include the switches 122 providing packet connectivity, with the TDM and optical layers omitted (of course, these exist as an underlay network, but can be managed separately). Further, those skilled in the art will recognize the control plane 140 and/or the SDN controller 150 may be omitted in some applications.

The terms "client" and "server" are used herein with reference to the network 100. Generally, the terms client and server represent the layers. For example, Layer 0 may be a server layer supporting Layer 1 clients. Of course, other embodiments are possible.

§ 2.0 Server

Figure 2:
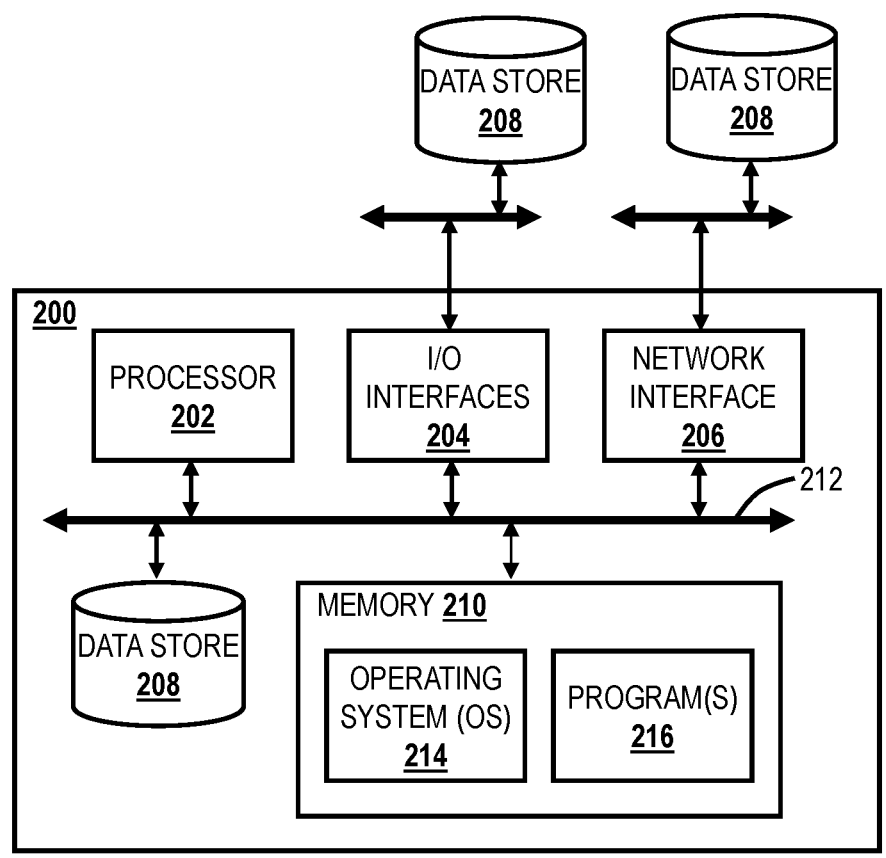

FIG. 2 is a block diagram of a server 200, which may be used to implement the management system 160, the SDN controller 150, etc. In the systems and methods described herein, the server 200 can be used to present a User Interface (UI) or Graphical UI (GUI) to an operator for accomplishing the various processes described herein. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate over a network. The network interface 206 may include, for example, an Ethernet card or adapter (e.g., 10BaseT, Fast Ethernet, Gigabit Ethernet, 10

GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., Random Access Memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., Random Access Memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The server 200 can be connected to the network elements 122, 124 in the network 100, such as via the network interface 206. This connection provides a conduit through which the hardware in the network 100 can be programmed following instructions from the SDN controller 150, the management system 160, etc.

Also, it will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

§ 3.0 Topology Discovery Overview

For users of the management system 160, a critical unit of business value is a service crossing the network 100. For a large network operator, in particular, the discovery and tracking of all the services under management becomes a performance-critical concern for the management system 160. The service discovery design must, in particular, answer to the following requirements:

Provide high peak throughput of discovery in the face of changes on or near the scale of the full network (e.g., the initial discovery of the network 100; migration/upgrade/restoration; addition or removal of a large network region).

Minimize latency of change propagation so that the network operator sees service life cycles without significant lag. In particular, when provisioning or de-provisioning individual or groups of services, it is desirable that rapid feedback and responsive visibility can be achieved across the service-aware network views provided by the management system 160. Ideally, the management system 160 function of service tracking itself introduces no delays on a longer time scale than that defined by the network element interactions.

Provide a means of scaling to very large networks on the order of $10^5$ and approaching $10^6$ services and beyond while preserving the latency and throughput characteristics above.

In the following disclosure, a design is presented that specifically addresses each of these key areas.

The following in section § 4.0 illustrates how the suitable application of concurrent, distributed observation at each layer in the network 100 simultaneously can take advantage of horizontally scaled setting where processor cores, memory, and disk I/O, in the management system 160, can be leveraged proportionally as the network 100 grows. With regard to minimizing latency and efficient use of compute resources, the problem is first framed by contrasting with past approaches and, in response, introducing a new optimality property for the discovery of complete services. Under this property, a topology service performs a bounded amount of work to determine an incremental output change for a given atomic input change; this is referred to as Change-Proportional Online Discovery (CPO), and it will serve as a key concept defining the design problem and proposed solution. Proceeding from the concept of change-proportionality per-layer, it is shown how the structure of a multi-layer network 100 allows pipeline-style concurrency, yielding system-wide the CPO property and a particular form of layer-wise horizontal scaling. For clarity of presentation and illustration purposes, assume: (a) a particular input normalization (atomization model, discussed herein) is provided for and (b) that the post-processing of services to include additional derived properties are not part of the core scope.

In section § 5.0, the balance of concerns for service discovery overall is presented, describing suitable pre-processing and post-processing event handling stages, how these stages interface with the core, and how they can be scaled out. Alongside a number of general points of design detail, this section completes the overall description of a high performance, scalable service discovery system. This system provides for a high rate of detailed, fine-grained nodal data to enter the system as a whole and richly decorated output services as output. Potentially, the combination of per-layer and inter-layer structure may have generalization to topological feature recognition applications beyond telecom networks.

In section § 6.0, the core design developed is extended to address a particular scaling limit. For many purposes and in many environments, the basic CPO algorithm presented in section § 3.0 will be sufficient to provide effective implementations. However, for particular cases of large networks, a scale breakpoint is eventually reached when the number of services on a single network layer exceeds the available unit of computing scale (i.e., what a generously provisioned modern server can hold in local memory). In this section § 6.0, this dimension is addressed with a natural continuation of the CPO intra-layer design that can be horizontally scaled when service growth concentrates in one or more layers.

§ 4.0 Change-Proportional Online Discovery: The Basic Concept

§ 4.1 Past Approaches Based on Periodic Full Sweep

To motivate the CPO concept, the periodic full-sweep discovery process is described. The full-sweep discovery is any realization of service discovery that considers all network input data and returns all discovered services as a job that starts at a point in time and ends after a set period. When an updated view of the network is required, the job is run again on-demand or as part of a periodically scheduled process. Again, this requires a full network cost per sweep, continuous utilization, and poor resource tradeoffs at scale. The full sweep approaches create a fundamental tension between network size and latency; this can be overcome somewhat by parallelizing, but that parallelism generically will have (a) an expensive footprint in terms of I/O and memory and (b) the expense in CPU, memory, and I/O is continuous and never-ending, even when the underlying changes in the network are relatively few.

§ 4.2 Proposed Approach

Now, let's turn to some design concepts aimed directly at addressing the shortcomings with full-sweep discovery, as a way to answer the question: how much better is possible? A general approach in computer science to reducing the latency of complex calculations in the presence of large and changing datasets is to seek an "online" form of a given algorithm such that ongoing changes in the input data set lead to appropriate incremental changes in output.

For present purposes, define online as follows: An online topology service only publishes discovered output changes in response to input changes.

By itself, this property may seem to address the continuous utilization problem, however it could still be achieved inefficiently if only minor changes to the full sweep algorithm were considered. For example, on every change meeting certain properties, one could force a new full network sweep; this would result in a lot of canceled jobs and presents problems for high-churn episodes where a lot of network state was changing at once.

To ensure the online principle is applied efficiently, it is desired to reflect the concept that a small change should have a proportionally small computational effort. While the intuition is useful here—some network changes should certainly have small effects that are relatively inexpensive to compute—the reality is, in some cases, a small change at the bottom of a network hierarchy could have a large (but still bounded) effect on many services above it. Therefore, it is concluded that in general, the strongest statement possible involves matching backward from the implied output change to any received input change:

Change-proportional topology discovery refers to the condition that internal work performed (for a given input change) by the topology service is in proportion to the ultimate output change.

These concepts can be combined as follows: A Change-Proportional Online (CPO) topology service only publishes output in response to input changes, and the amount of work performed in response to input is proportional in time complexity to the resulting output.

This work statement is centered around time complexity to give priority to minimizing latency, one of the anchor figures of merit. In describing a specific realization of a CPO algorithm below, memory and I/O aspects are evaluated in the service of efficiently realizing throughput and scalability; the utilization of these factors is shown to turn out to compare favorably to full network sweep.

§ 4.3 Core CPO Process (Linear Service Case)

Different network technologies across layers allow for a diversity of different topologies; the service topology may be simply a linear chain with end terminations, or it may be a much richer graph with cycles and multiple points of traffic termination. For clarity of presentation, a description of the core CPO process is presented in the linear service topology case; the concepts described for a linear topology can largely be carried over in one form or another to more elaborate topologies.

Figure 3:
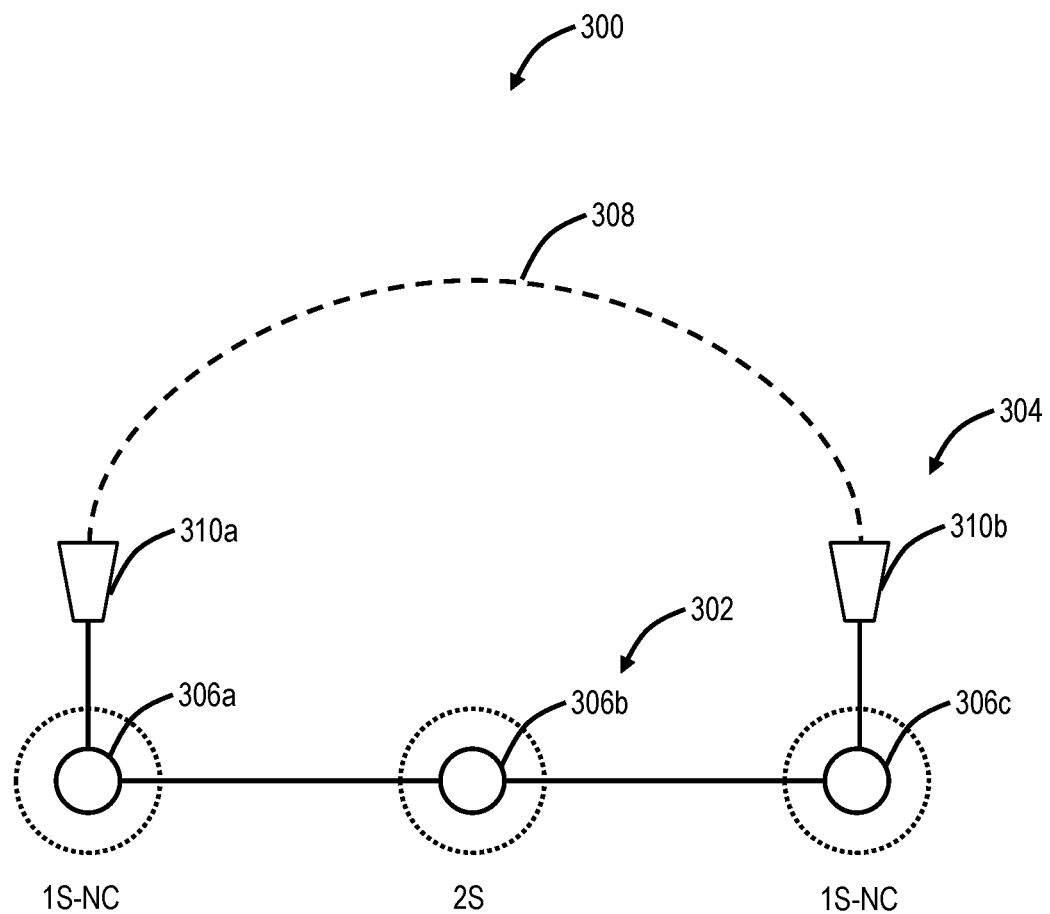
FIG. 3 is a graph illustrating a linear topology for a portion of the network.

FIG. 3 is a graph illustrating a linear topology 300 for a portion of the network 100. Here, the portion of the network 100 is illustrated as a graph with a server sub-graph 302 and a client sub-graph 304. In the linear case, the server sub-graph 302 has the form of a linear chain of nodes 306a, 306b, 306c. For terminology, the internal server node 306b contacts only two server edge nodes 306a, 306c, and is referred to as a 2S type node—two server nodes are connected to it. Each of the server edge nodes 306a, 306c is referred to as a 1S-NC node—one server and N clients are connected to it. In the linear topology 300, there is a single client 308 illustrated, between the server edge nodes 306a, 306c. Those of ordinary skill in the art will appreciate the linear topology is a simplified embodiment presented for clarity of illustration.

§ 4.3.1 Atomization of Input

For purposes of this section, it is assumed the input data streams synchronized from the network elements have been transformed into a stream of irreducible relational units, which is termed "atoms." These represent same-layer server-server (SS) atoms with no further decomposing structure required by service views, and client-server (CS) atoms with no intervening decomposing structure required for network visibility.

In reference to the linear topology 300, the server-server atom would be between the nodes 306a, 306b, 306c, and the client-server atoms would be between the nodes 306a, 306c and client vertices 310a, 310b. The scalability and performance aspects of the atomization process are discussed in more detail in section § 5.

§ 4.3.2 Per Layer Discovery

Assuming input atoms are received as a stream to a given layer, how does one efficiently test that a complete service is present? It can be seen in the linear case the condition is essentially a logical AND function of several basic statements that are topological with respect to the atomic relations and a more general predicate evaluating whether appropriate properties such as transmission parameters of a client are suitably matched; in summary the following condition is tested:

There exists a connected trail of atoms AND a client-server relationship on either end (satisfying some suitable matching condition).

A direct (but as not efficient) way to test this condition is upon receiving every atomic event, traverse the chain to both ends and check for clients. This incurs work proportional for average service chain length L of the order O(L); thus amortized over the fragmentation states (O(L) events will need to be handled before service is seen as complete) the total cost of discovering the service is $O(L^2)$; this prompts us to consider if O(L)—a requisite minimum given need to form service details along path for publication—is possible.

It is possible if there is a data structure that allows a test in constant time (rather than linear time) whether the present fragment received "completes" the service or not. For this purpose, the Union-Find-Delete (UFD) data structure is introduced. In this data structure, in a graph such as in FIG. 3 with connections, a unique representative of a connected cluster can be found in constant time, and merges can be made in constant time to grow each cluster as relations are added. Hence, if the two ends of an incoming fragment are in two different sets, and each of these sets is terminated, one can justify asserting the service and performing a traversal to provide the necessary details for publications.

An important note in passing is that, until the point of service completion (which triggers linear traversal), the behavior per event has a uniform and bounded cost—in essence, check the UFD, append atom to traversal buffer, and in limited cases update client termination state. All these operations are realized in effectively constant time using in-memory data structures.

Figure 4:
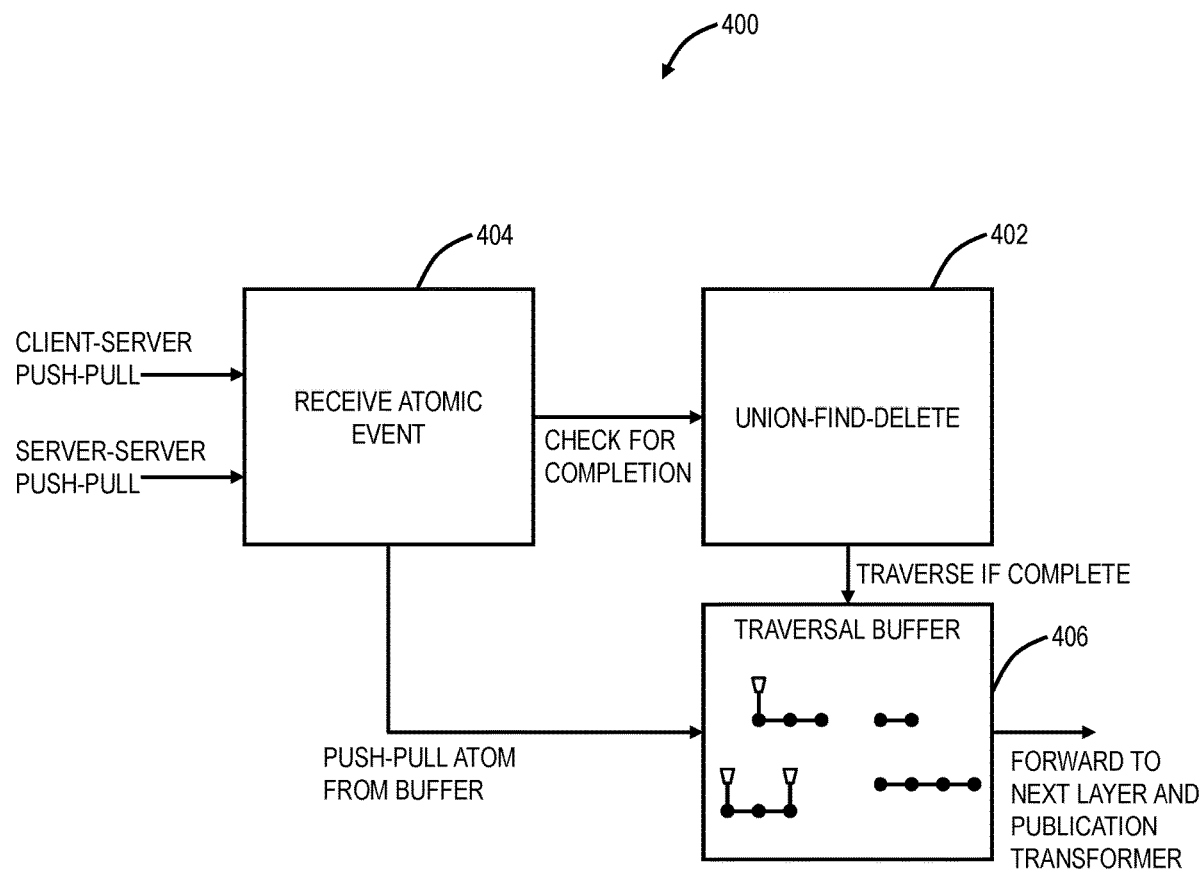
FIG. 4 is a block diagram of an intra-layer process with a Union-Find-Delete (UFD) data structure.

FIG. 4 is a block diagram of an intra-layer process 400 with a UFD data structure 402. For a given network layer, atomic inputs 404 are received from nodally based event producers or from the output of other layer observers, e.g., client-server push-pull, server-server push-pull, etc. Each received event is interpreted as the addition or removal of an atomic relation, and this is in all cases absorbed by a traversal buffer 406 as an insertion or removal (realized in constant time and referenced to endpoint of atom).

On each add type event, the UFD is checked to determine:
(a) if new atom vertices are in separate partitions. If they are, check the client state on the originally two disjoint partitions; if and only if they are both terminated and matched, this event completes to trigger traversal and publication.
(b) if the new atom grows an existing partition, check if the client-server relation has been received for the extended vertex and for the existing partition; if and only if both are terminated and match this event completes to trigger traversal and publication.

Before concluding, note that a basic property of the intra-layer handling is that atoms, whether CS or SS type can arrive in any order without affecting the time complexity considerations above and the final recognition of complete service. A second important property to realize in practice is that the intra-layer handling is tolerant to repeated inputs—this is a helpful property upon certain system restart and fault recovery scenarios.

§ 4.3.3 Inter-Layer Event Flow and Concurrency

Figure 5:
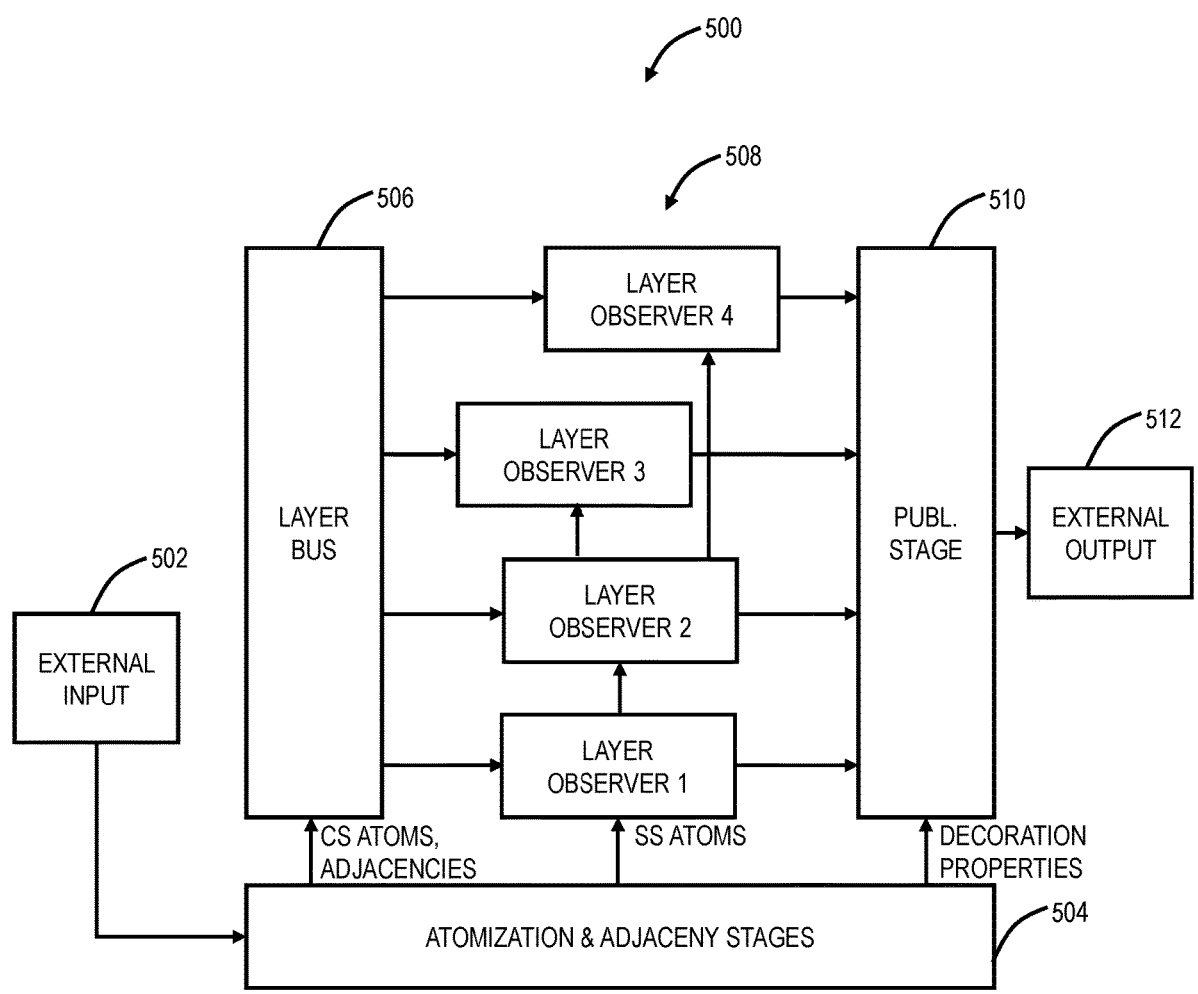
FIG. 5 is a block diagram of a topology discovery system.

FIG. 5 is a block diagram of a topology discovery system 500. FIG. 5 illustrates the system function, performance, and scale realized across the full-service layer hierarchy, with the per-layer discovery constituting the core event flow. The topology discovery system 500 includes an external input 502 connected to atomization and adjacency stages 504. A layer bus 506 connects to layer observers 508, which connect to a publication stage 510 that provides external output 512.

The layer observers 508 are an encapsulation of the intra-layer state, each instantiated 1-1 with the logical layers of the network 100, and possess the intra-layer event handling behavior described above. At its interface, it handles events that assert the add and removal of SS and CS atoms. As mentioned, the final output 512 is invariant under any re-ordering of atom histories relative to one another. Each layer observer 508 outputs events corresponding to the discovered "stitched" service—this takes the form of an SS atom from the perspective of the layer observer 508 on the associated client layer; the post-processing stage also receives this SS atom, and it is further decorated as described in section § 5.

General Interlayer Propagation: Each layer observer 508 is uniquely associated with modeling effective serving connectivity at that layer, and (possibly multiple) client layer terminations. When compatible client-server relations are provided in the presence of a connected server path, the result is a "completion" event that results in pushing an SS atom (with layer based on client structure) to the corresponding layer observer. In FIG. 5, see layer observer 1 has a single client rate it supports while layer observer 2 has two possible clients that can terminate over its own server paths.

Initial input propagation: For understanding the system flow, it suffices to emphasize that the layer observers 508 are fed by atomization and adjacency stages 504. The atomization stages 508 start with entities in a nominal network model and filter down to the bare, irreducible topological relationships that layer observers 508 need to construct their internal model.

To understand the role of adjacency state, there are certain distinguished layers that act to anchor the overall flow of topology. On these layers, the connectivity is not defined recursively in terms of a lower layer. Rather, some other additional data source defines how the servers on this layer get populated. A typical example would be the bottom-most fiber layer of a photonic network. In general, an external data source could explicitly inject the topological links for this layer; another possibility is that only the endpoint structured data is provided, in which case the service discovery application has to use matched tags or some other protocol data to infer connectivity at the layer in question. Scalable approaches to atomization and adjacency are further discussed in section § 5.

§ 4.3.4 Concluding Overview & Performance/Scalability Analysis

Again, with reference to FIG. 5, the topology discovery system 500 is described further. The external input 502 arrives at the service via an event message facility. Each event can be typed as an Add, Update, or Delete, and the implied internal events are generated via the atomization and adjacency stages 504 (collectively providing the pre-processing system function). As indicated by the arrows in FIG. 5, the output of these pre-processing stages is constituted by two internal streams of events that pass through the core array of the layer observers 508.

One stream associated with CS atoms is received by each layer observer 508 directly from the atomization stage 504. The SS streams, in turn, flow upward through the layer hierarchy in a generally branching pipeline topology indicated in FIG. 5. With this event flow in mind, positive properties are noted at this point:

Fully asynchronous: At the system interface level, full asynchrony in the form of allowing event histories to be received in no particular order provides a maximal amount of flexibility to how the network elements are synchronized. In a nominal case with no faults, each network element can push out its events at will, and the topology discovery system 500 can handle any interleaving of the received events while still converging to correct final output. In a faulted case, a common recovery strategy of restarting a network element and replaying events will also leave convergence invariant due to idempotence property mentioned above. Internally, the fact that there is no staging of discovery per layer (common in full sweep approaches) means that each layer observer 508 can make progress toward convergence with whatever inputs it has received to date. The style of concurrency in the literature is sometimes referred to as pipeline concurrency and is a commonly applied strategy where stages of processing follow a natural flow of causation, as is the case in the multi-layer network discovery.

Layers and other stages as unit of concurrency: Given the asynchronous observation above and the way per layer service state is uniquely owned by each layer observer 508, it is seen that each layer observer 508 (which is sole owner of the traversal buffer and UFD state for its layer) can safely use a processor core per-layer and possesses guaranteed memory safety for its intra-layer computations.

Composing the per-layer CPO property of above subsection, one can claim the multi-layer CPO property: as any input changes ripples from whatever lowest layer is involved, it results in computations and publications only in proportion to the implied change at any layer, with the sum total set of changes defining the final scope of change.

In turn composing the pre-, core, and post-processing scalability properties and assuming a scalable, high throughput distributable event bus 506, the design provides overall horizontal scalability alongside efficient use of compute resources guided by CPO property.

Specifically, in the initial synchronization/full network cases, one sees how in a layer with N actively used layers, it can simultaneously be progressing the service discovery using up to N physical core threads of execution, in addition to whatever threads are used in the other stages (i.e., pre- and post-). In passing, note that the layer observers 508 can be grouped together on same physical host machine (in which case internal messaging bus is used), or in limit of many populated layers, the messages can be passed over the network fabric.

§ 5.0 Generalized Cases & Supporting Innovations

The following section provides additional details, as well as generalizations that have a natural affinity with the core design above and contribute to the overall practical suitability of the topology discovery design.

§ 5.1 General Typology of Service Discovery

Figure 6:
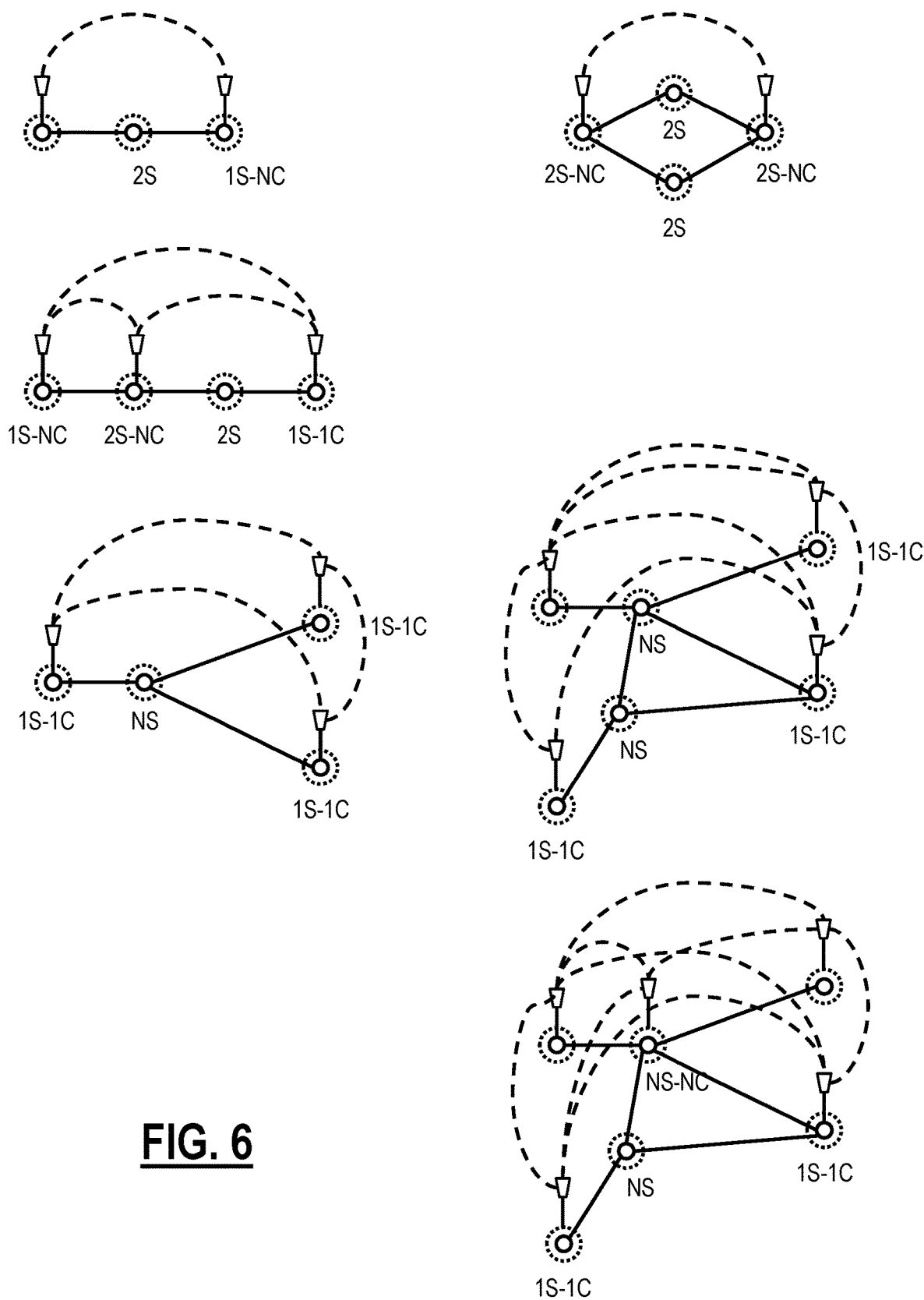
FIG. 6 are graphs of various generalizations of the simple linear topology of FIG. 3.

FIG. 6 are graphs of various generalizations of the simple linear topology 300. Without going into full detail for each case, some general observations are made indicating how the key CPO properties are extended to a number of these cases. Services that are terminated on boundary points can defer traversals unless each vertex is either an interior point (with more than one neighbor) or is a boundary point (with one neighbor), but the client is terminated.

N-legged protected services can be treated as a composite of linear services where a higher-order observer defers publication until both (or generally N) expected protection legs are observed.

For service topologies where terminations can occur at interior vertices (with two or more neighbors), the following cases apply:

Server topology is known to always form a ring at this layer: In this case, use UFD to detect closing or opening of the ring topology, and defer traversal until this point. A choice exists whether to block completion until each vertex of a particular type has its expected client termination. A general strategy for "sweeping" partially complete services is described in section below that may be applicable to this case.

For service topologies that form a general mesh, in a maximally unconstrained case in which "anything goes" as a service—this is not a typically encountered case in experience; completion could potentially be controlled by assuming server vertices are marked in a way that indicates that termination is expected or not. In any case, the partial sweeping strategy could be applied if no completion trigger is forthcoming in considering the specifics of the service model.

§ 5.2 Memory Efficiencies

A number of supporting engineering approaches have been found that hold important practical advantages when used in combination with the core design described herein.

Model reduction—As an aid to initial development, it was determined first to be convenient to cache incoming nodal data in full detail so properties can all be accessed for either core topology function or post-processing function. However, in the interest of memory savings, a production implementation should establish a framework in which a much-reduced version of the full network entity model is used internally, with event handling stages at the service boundaries mapping directly into the reduced model following event deserialization.

Disk cold caching—For data that is used only upon completion (properties that do not play a role in atomization, but in post-processing), it may be advantageous to draw on typically more plentiful disk space versus memory for such properties that are read-only once or occasionally.

Tokenized compression of referential state—the UFD, traversal buffers, and support property key-value stores all have key-spaces, and in most cases, value-spaces comprised of unique string identifiers. This renders them relatively lightweight relative to the entity objects. However, in practice depending on how unique identifier is formed a large amount of compression may be possible via lossless compression on the key-space. At the cost of some CPU cycles to compress and uncompress on the outbound stages, a comprehensive compression of memory can be achieved as relation state that drives core function are all in terms of these identifiers.

§ 5.3 Pre-Processing Scaling

As discussed in section § 4 above, the pre-processing includes atomization and adjacency handling. For completeness, immediately prior stages of deserialization and model reduction are added.

Deserialization and model reduction: parallelizes trivially per entity. The worker pool can be scaled to incoming throughput rates.

Atomization: parallelizes trivially per entity. The CS atoms derive from nodal termination entities, and the SS atoms derive from intranodal connectivity. A particular physical core could be tasked with some partition of work broken down by partition over network elements or based on more dynamical load balancing. No state across different network elements needs to be shared for atomization, and the final output can be pushed onto a logically common event bus distributed upwards to the layer observers.

Adjacency: assume, as is common practice, that adjacencies are established either manually or through an automatic protocol whereby the participating endpoint ports on either side of an adjacency hold a common network-unique tag. To scale this horizontally, the key-space of the adjacency tag is consistently hashed and distributed among M partitions, and each one is responsible for holding the near-far references for its tag. Using the same or different partition used for atomization, all incoming network data is scanned for adjacency tags, and on each add/update/deletion, a message is passed to the tag cluster to update the value and for tag cluster to follow-up with a check on whether both sides are matched. In summary, scanning/extraction of tag can parallelize trivially alongside atomization, and the tag checking when distributed allows for M fold threads of execution (largely key-value add/append/read) to occur concurrently as a horizontal scale strategy.

§ 5.4 Post-Processing Scaling

Core topology discovery by design yields a relatively skeletal representation of the service (i.e., endpoints, partition down to servers immediately support, and any additional core relations related to protection or bidirectionality). In practice, it is natural to use the topology discovery event handling as a point in the system for the output services to accumulate derived properties that become defined once the service is established but not before.

Upwards propagated decoration: A typical example would be promoting attributes such as user labels that exist on endpoint ports to become properties of the discovered service. Many other examples similar to user labels can be seen in practice, and a general form of this can be defined that covers a broad class of post-processing computed properties called upward propagated. Upward propagated properties are any properties that can be found as a function of service endpoint and immediately supporting services, service endpoint of immediately supporting services and the next layer down of supporting services, . . . recursively until lowest layers are reached . . . .

As is clear by considering the hierarchy of layer observers 508, one can reason from the causal structure of completions that when a service needs decorating at a higher layer, its supporting underlying services have also been discovered as complete. This allows the evaluation of the general recursive function above to be evaluated in a continuous manner with materialized inputs, with intermediate values upwards propagated to higher layers where they can be used for further decoration. From a scale and performance perspective, because work is triggered by completions, the analysis can inherit, in essence, the properties possessed by the core discovery process.

General decoration: a more niche but potentially important case occurs when the presence of services at a higher layer needs to be reflected back "down" to properties of services on lower layers. A general approach to scale is to again divide into post-processing entities per-layer, and within layers further partition the space of unique service ids so an additional degree of parallelism can be achieved. In this manner, a downward propagation of property derivation can be achieved. A note in passing is that in some scale-out strategies that lose causal order among completing services as events propagate to per-layer post-processing handlers, it may be necessary to hold a "to be delivered mail-box" for messages that reference a service that will arrive but does not yet exist at the responsible layered post-processing handler. A similar effect does not occur in the upwards propagated case.

In conclusion, a large space of upward propagation property decoration is particularly natural to incorporate alongside the core discovery and publication event pipelines. The downward decoration is also possible to provide and scale horizontally, but requires a few additional considerations and compute resources, primarily in the form of some additional I/O and memory to buffer messages.

§ 5.5 Partially Completed Discovery

In a more fully-featured or advanced stage management system 160, it may be a requirement to discover not only services that are complete and capable of passing traffic but also fragments of services in which structure required for complete service is missing. This is referred to as the "partial service" discovery problem. While approaches may vary and can be viewed as independent of the core problem of discovering complete services, an approach that integrates well with the other design aspects discussed so far is as follows.

Note that all services, including ones destined to be complete, will pass through a succession of fragmentary states of partial completion. In light of this, naively generating an event on every partial completion will generate an enormous volume of low to zero (in case of those that ultimately complete) value.

Partial services should be the exception rather than norm in a healthy network; on a well-managed network, the partial services should over time be actively driven towards zero through management intervention as they represent stranded network resources and a failure of realizing a user intent in the form of a working network service.

The above special properties of partial services (as opposed to services for which a concept of completion exists) can be targeted by a process similar to the full sweep process, but under suitably tuned operating conditions and applying the specific assumptions for this case.

In regards to the general case, the following applies:

During initial discovery, the rate of partial service discovery can be throttled back to a very low frequency to address the high churn of initial synchronization. The throttling could be on consumer side using throughput load measurements and fed back to topology service as backpressure. Alternatively, it could be measured on producer side using basic or sophisticated measures to determine when input or completed service output discovery has settled down sufficiently to justify a sweep for partial fragments.

Following the initial discovery, knowledge of whether a vertex is part of a completed service could be used to preemptively exclude an attempt at traversing in search for partial connectivity; as network completes it synchronization and coalesces into predominantly completed services, this vastly reduces the amount of work needing to be performed by partial sweep.

To detect fragmentation as it arises in day-to-day network operation, partial sweeps would be scheduled on a periodic basis. Additional optimization to exit early are possible by again using UFD structure to detect if any change has occurred since last sweep, providing a similar performance profile to the completion case using a common data structure.

§ 5.6 Advanced Management System Extensions & Broader Generalizations

§ 5.6.1 Generalization as Topological Feature Detection

The following provides possible ways the technology developed for telecom service discovery could potentially be applied to other fields adjacent and beyond telecom. A single layer observer 508 essentially exists to:

Recognize a particular topological situation exists (in a manner that is efficient to evaluate on every event); one could generalize service to a more generic "topological feature."

Provide additional analysis at the point where a topological feature is "recognized," and some properties (client-server relation in telecom case) associated with topology vertices are present and satisfy some condition.

Forward recognized features as input to other special-purpose feature observers that may integrate this feature with other context to construct additional feature inventories.

General Network Management: logistics networks such as electricity, pipelines, railways, and roads could conceivably have a variety of hierarchical, flow-oriented views grounded by underlying physical infrastructure and recursively defined via successive aggregation/disaggregation relationships.

For example, a road system could serve as a transport base layer partitionable into segments between key intersections, with multiple transport vehicles carrying multiple containers containing multiple commodities providing a flow hierarchy. In commercial shipping or disaster relief contexts, the precise, real-time details of how a given commodity type of interest is flowing or not to specific endpoints could be of considerable operational interest.

In an electricity grid, high voltage trunk lines distribute out to lower voltage lines and ultimately to endpoint consumers. Each end consumer can be thought of as inducing a flow, ultimately originating from one or more primary generating sources, and as such fine-grained flows supported by higher capacity infrastructure recursively could hold value as units of management and tracking.

Topological Feature Classification Tree: there is potentially a broad generalization of the technology wherever an analysis can be described as a hierarchy of topological observers that start (at lower "layers") recognizing some broad, general class of features while sub-layers provides sub-classification into more specific patterns, and so on recursively. For example, one could consider activity over a social graph in real-time such as relationships on a large social network site or the structure of banking transactions. In such examples, a base layer could initialize the analysis pipeline by partitioning into communities of individuals, making use of relationships such as shared geographic location or a declared "friend" or "following" relation. Higher layers could, in turn, use other relationships to look for idiomatic clusters such as central influencers (a tree-like topology) or a cycle of specific financial transactions that may signal potential for fraud or a connected, cyclically structured sub-community that mutually inflates its ratings or reviews.

In all the above examples (as well as the telecom case), the end result of feature recognition could be fed to user interfaces and logs as per the conventional management system 160 practice. Alternatively or additionally, in a more machine-guided analytics use case the features (along with, for example propagated time-stamps from underlying input) could be fed to a machine learning facility that could take various structured or unstructured approaches to causal prediction or other forms of modeling patterns in topological conditions of interest.

While the above examples are chosen to illustrate the potential breadth of application, it should be stressed that to be of greatest relative advantage versus alternative approaches, the generalized applications should have a real-time, online and/or high-throughput character to them. If it is acceptable to complete a series of queries or reports executed as a series of "batches" running on the time scale of many hours or days, there may not be particular advantage to our technology; conversely real-time responsiveness tends to be a much more constrained problem which could have much few alternatives.

§ 6.0 Intralayer Horizontal Scale and Concurrency

For network discovery within the provided solution to accommodate service growth that concentrates on particular layer, UFD and other supporting intra-layer data structures that are distributed across N servers working in parallel can be used, potentially using multiple physical cores per machine. Alternatively, depending on working data size requirements an alternative is to pin a given layer to a single (generally multi-core) server, but using the larger storage capacity of disk media vs. just memory to provide the capacity needed.

Concurrent (multi-core) algorithms for the Union-Find (UF) and Union-Find-Delete (UFD) problem have been demonstrated in the literature; by allowing multiple physical cores on a machine to be applied to the problem the total throughput requirements are accommodated even in the face of slower data structure access across network or with the use of disk media. Additionally, UF and UFD algorithms in the literature that are known as I/O efficient are beneficial. Such algorithms minimize the amount of latency in disk or cross-network access in a disk-based or a network distributed scale-out setting. To summarize, the problem of intra-layer scaling of UFD within our solution is addressed through two types of approaches: taking advantages of multiple cores to assure that throughput can be maintained, and through the use of I/O efficient approaches to minimizing latency of access when distributing the state across network or to disk. A given realization would use one or a combination of both of these methods, depending on its requirements. Note, the UFD data structure or algorithm may also be referred to as a "connected component" data structure or algorithm.

The balance of other supporting intra-layer data structures follow a similar pattern; these supporting data structures are essential key-value maps, and they would both be distributed across multiple services to address scale of data but simultaneously operate concurrently to allow for high throughput. Multiple technologies that do just this are currently available (often referred to as "distributed map" or "distributed cache") and can readily incorporated into the solution in the event the requirements call for large intra-layer scale.

§ 7.0 Topology Discovery Process

Figure 7:
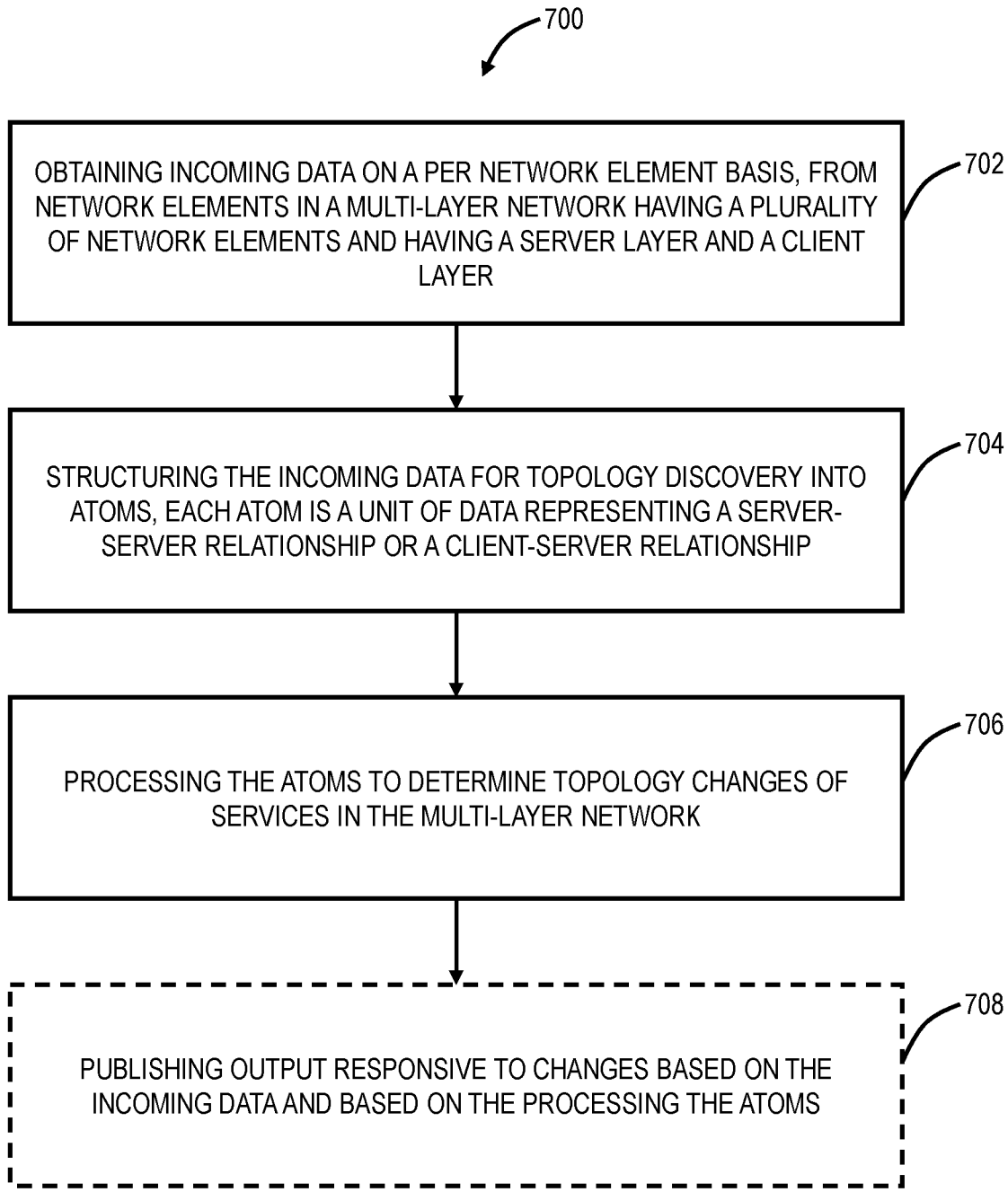
FIG. 7 is a flowchart of a topology discovery process.

FIG. 7 is a flowchart of a topology discovery process 700 based of the foregoing descriptions. The topology discovery process 700 can be a computer-implemented method, embodied as instructions in a non-transitory computer-readable medium, and implemented on the server 200, management system 160, etc. The topology discovery process 700 includes obtaining incoming data on a per network element basis, from network elements in a multi-layer network having a plurality of network elements and having a server layer and a client layer (step 702); structuring the incoming data for topology discovery into atoms, each atom is a unit of data representing a server-server relationship or a client-server relationship (step 704); and processing the atoms to determine topology changes of services in the multi-layer network (step 706). The topology discovery process 700 can further include publishing output responsive to changes based on the incoming data and based on the processing the atoms (step 708). An amount of the processing is proportional to the changes.

The topology discovery process 700 can further include performing the processing the atoms concurrently across the server layer and the client layer. The topology discovery process 700 can further include utilizing a data structure in the structuring to detect a service completion at a layer, wherein the data structure represents connections in a graph, such as those in FIGS. 3 and 6, supporting a constant time lookup. The atoms are utilized to detect a complete service, for the topology changes, through a connected trail of atoms and a client-server relationship on both ends of the connected trail of atoms. The incoming data can be asynchronous from the network elements.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processing device to perform steps of:
obtaining incoming data on a per network element basis, from network elements in a multi-layer network having a plurality of network elements and having at least a server layer and a client layer that operates over the server layer;
structuring the incoming data for topology discovery into atoms, each atom is a unit of data representing a server-server relationship or a client-server relationship;
processing the atoms at various layers including the server layer and the client layer in parallel to determine topology changes of services in the multi-layer network, wherein the various layers include any of Layer 0, 1, 2, and/or 3, wherein the server-server relationship models connectivity within one of the any of Layer 0, 1, 2, and/or 3, and wherein the client-server relationship models connectivity between adjacent layers of the any of Layer 0, 1, 2, and/or 3; and
detecting the topology changes by comparing the processed atoms to existing atoms, wherein the atoms are utilized to detect a complete service, for the topology changes, through a connected trail of atoms and a client-server relationship on both ends of the connected trail of atoms.

2. The non-transitory computer-readable medium of claim 1, wherein the instructions further program the processing device to perform steps of
publishing output responsive to changes based on the incoming data and based on the processing the atoms.

3. The non-transitory computer-readable medium of claim 2, wherein an amount of the processing is proportional to ultimate output change.

4. The non-transitory computer-readable medium of claim 1, wherein the instructions further program the processing device to perform steps of
performing the processing the atoms concurrently across the server layer and the client layer.

5. The non-transitory computer-readable medium of claim 1, wherein the instructions further program the processing device to perform steps of
utilizing a data structure in the structuring to detect a service completion at a layer, wherein the data structure represents connections in a graph, supporting a constant time lookup.

6. The non-transitory computer-readable medium of claim 1, wherein the incoming data is asynchronous from the network elements.

7. An apparatus comprising:
a processor and memory including instructions that, when executed, cause the processor to
obtain incoming data on a per network element basis, from network elements in a multi-layer network having a plurality of network elements and having at least a server layer and a client layer that operates over the server layer,
structure the incoming data for topology discovery into atoms, each atom is a unit of data representing a server-server relationship or a client-server relationship,
process the atoms at various layers including the server layer and the client layer in parallel to determine topology changes of services in the multi-layer network, wherein the various layers include any of Layer 0, 1, 2, and/or 3, wherein the server-server relationship models connectivity within one of the any of Layer 0, 1, 2, and/or 3, and wherein the client-server relationship models connectivity between adjacent layers of the any of Layer 0, 1, 2, and/or 3; and
detect the topology changes by comparing the processed atoms to existing atoms, wherein the atoms are utilized to detect a complete service, for the topology changes, through a connected trail of atoms and a client-server relationship on both ends of the connected trail of atoms.

8. The apparatus of claim 7, wherein the instructions that, when executed, further cause the processor to
publish output responsive to changes based on the incoming data and based on the processing the atoms.

9. The apparatus of claim 8, wherein an amount of the processing is proportional to ultimate output change.

10. The apparatus of claim 7, wherein the instructions that, when executed, further cause the processor to
perform the processing the atoms concurrently across the server layer and the client layer.

11. The apparatus of claim 7, wherein the instructions that, when executed, further cause the processor to utilize a data structure in the structuring to detect a service completion at a layer, wherein the data structure represents connections in a graph, supporting a constant time lookup.

12. The apparatus of claim 7, wherein the incoming data is asynchronous from the network elements.

13. A method comprising:
obtaining incoming data on a per network element basis, from network elements in a multi-layer network having a plurality of network elements and having at least a server layer and a client layer that operates over the server layer;
structuring the incoming data for topology discovery into atoms, each atom is a unit of data representing a server-server relationship or a client-server relationship;
processing the atoms at various layers including the server layer and the client layer in parallel to determine topology changes of services in the multi-layer network, wherein the various layers include any of Layer 0, 1, 2, and/or 3, wherein the server-server relationship models connectivity within one of the any of Layer 0, 1, 2, and/or 3, and wherein the client-server relationship models connectivity between adjacent layers of the any of Layer 0, 1, 2, and/or 3; and
detecting the topology changes by comparing the processed atoms to existing atoms, wherein the atoms are utilized to detect a complete service, for the topology changes, through a connected trail of atoms and a client-server relationship on both ends of the connected trail of atoms.

14. The method of claim 13, further comprising
publishing output responsive to changes based on the incoming data and based on the processing the atoms.

15. The method of claim 14, wherein an amount of the processing is proportional to ultimate output change.

16. The method of claim 13, further comprising
performing the processing the atoms concurrently across the server layer and the client layer.

17. The method of claim 13, further comprising
utilizing a data structure in the structuring to detect a service completion at a layer, wherein the data structure represents connections in a graph, supporting a constant time lookup.

* * * * *